June 24, 1969

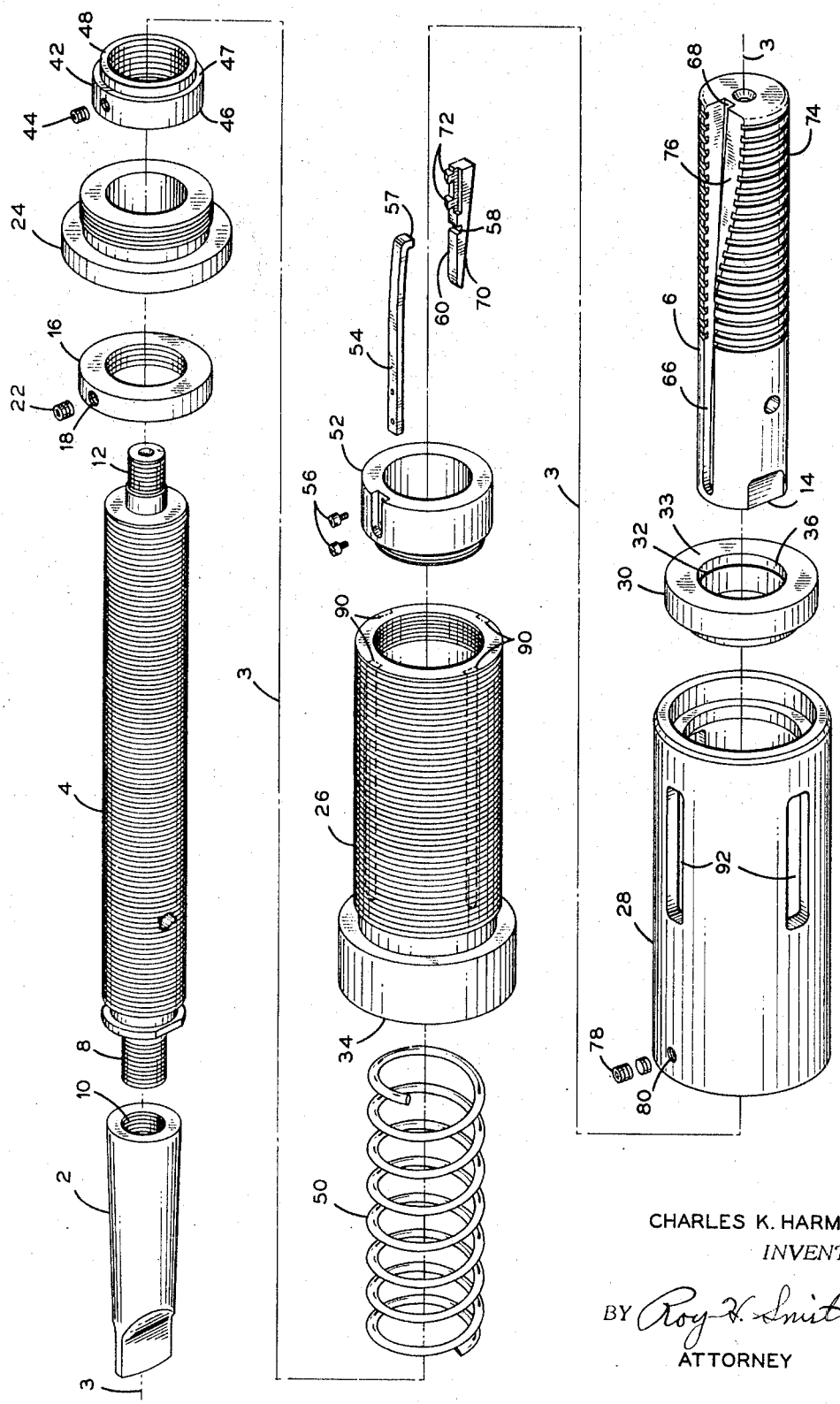

C. K. HARMAN 3,451,294

GROOVING TOOL

Filed May 2, 1967

CHARLES K. HARMAN
INVENTOR.

BY Roy H. Smith, Jr.
ATTORNEY

United States Patent Office 3,451,294
Patented June 24, 1969

3,451,294
GROOVING TOOL
Charles K. Harman, Houston, Tex., assignor, by mesne assignments, to Twentieth Century Tool Co., Houston, Tex., a corporation of Texas
Filed May 2, 1967, Ser. No. 635,486
Int. Cl. B23b 47/18, 51/00
U.S. Cl. 77—58                 9 Claims

ABSTRACT OF THE DISCLOSURE

A tool used to form grooves in holes through the end plates of such structures as heat exchangers, so that tubes running between such plates and securely fitted into such holes can be upset into the grooves to further secure and seal the tubes in place. Theretofore one complete grooving tool was required for each different size hole in various end plates, and the major contribution of the invention is a grooving tool assembled so that only two relatively small components need be removed and replaced with others of a different size in going from one hole size to another. The specific parts thus changed are the forward end of the mandrel, which contains the tapered groove which slides under the bit and pushes it into the workpiece to form the grooves therein, and the spring adaptor ring, a member which acts as a steady for the forward part of the mandrel and also controls the location of the bit, being linked to the bit by an axially elongated, radially flattenable bar spring.

---

Figure 5:
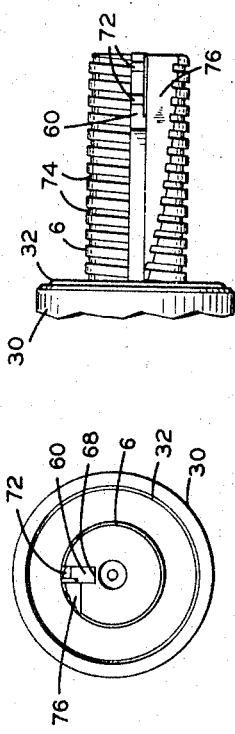

The present invention lies in the general field of chucked and motor-driven cutting tools, and can be more particularly described as a grooving tool, i.e., a tool having a forward end which is inserted in a hole and is equipped with a cutter which is then gradually expanded in the radial direction to form one or more grooves as the tool is rotated at a relatively high speed. When the grooves have been cut to the desired depth, the cutter is retracted radially back into the forward end of the tool and the tool is then removed axially from the hole and carried on to another hole. Such tools are particularly useful in the fabrication of structures having a pair of thick parallel plates spaced from each other and having multiple holes therethrough formed in coaxial pairs and adapted to receive tubing, e.g., boilers and other heat exchangers. Each tube fits tightly in its pair of holes, and is further secured and sealed to the pair of end plates by a tool which upsets or swages the tube into the grooves formed by the grooving tool of the present invention.

The undersigned applicant-inventor recognizes that grooving tools of the type thus far mentioned have previously been made and are presently commercially available, and does not claim to be a pioneer inventor of all grooving tools which will do an adequate, satisfactory job for the manufacturer of heat exchangers. However, to the best of his knowledge those grooving tools which have heretofore been published or put into commercial channels of sale or use do have disadvantages which it is the object of the present invention to overcome. One of the principal such disadvantages lies in the fact that not all holes in the plates to be grooved are of the same diameter—in fact a great range of hole sizes are employed, varying with the requirements of various customers and the response of the heat exchanger designer to such varied requirements.

Up to the time of the present invention those who make and sell grooving tools have responded to the varying requirements of heat exchanger fabricators only by making complete grooving tools so that there is one such complete tool for each different hole size. The fabricator must buy one tool for one-inch holes, a second tool for one-and-one-eighth inch holes, and third for one-and-a-quarter, and so on for all larger all smaller and all intermediae sizes. Since each tool is costly, e.g., at least two hundred dollars and becoming more costly with increasing size up to well over five hundred dollars, it is apparent that the user of the tools must make a sizable capital investment in such tools in order to be prepared to groove a large number of hole sizes. This cost can obviously be a major item of concern to the small fabricator who executes small orders for all and sundry who give him business, as the small operator is the one most likely to work on a wide range of product sizes and to be the least able to afford a huge investment in tooling.

In prior art grooving tools there is invariably a mandrel or shank forming the principal part of the elongated tool and running the full length thereof as one integral piece, or at least as pieces secured together for operating purposes and not adapted for breakdown to accomplish a size changeover, as exemplified, for instance, in the United States patent issued to H. J. Pfrehm in 1948, No. 2,457,269. In such tools the near end of the one-piece mandrel, that nearest the operator, is machined to form a shank adapted to be received in a motor-driven chuck, intermediate grooves and slots are formed in the outer surface for various purposes, and the distant end of the mandrel is machined with a longitudinal groove having a forwardly and inwardly sloping bottom surface adapted to receive and cooperate with a cutter or bit having a similarly sloping bottom surface. The bit is secured to another part of the overall tool so that its axial position is fixed during operation, whereas the mandrel is extended axially during the grooving-forming step to force the cutter radially outward to engage and cut into the workpiece as the whole tool is rotated. In its simplest form the action is like sliding a lower inclined plane under an upper, inverted inclined plane. It can be visualized also by thinking of starting with a simple rectangular block, making a transverse diagonal saw cut through the block to separate it into upper and lower half-blocks having mating inclined planes slidable on one another, and then pushing the lower block under the fixed upper block to raise the latter to a greater height.

To complete the analogy to prior art grooving tools, one can think of replacing the lower half-block with a cylindrical member, specifically the forward part of the mandrel, and forming the inclined plane as the bottom surface of a longitudinal groove which extends smoothly from a maximum depth at the forward end of the mandrel to a minimum depth at an axial location spaced rearwardly from such forward end The bit itself is generally shaped like a rectangular half block with a tapered bottom surface and having on its radially outermost surface one or more cutting lugs which protrude upwardly (radially) therefrom. One purpose of the cylindrical forward end of the mandrel is to steady the entire tool and keep it coaxially aligned with the hole being grooved, and to accomplish this it is necessary that it fit fairly snugly in the hole, and this implies that its diameter must coincide fairly closely with that of the hole—with just enough of a small gap to permit ready insertion and withdrawal.

This requirement obviously means that the forward end of the mandrel must be of a different diameter for each different hole diameter, and has apparently blinded prior art workers into a conviction that the whole tool must therefore be of a different size for every different hole size. They seem to have looked at their one-piece mandrels and concluded that there is nothing possible to do in changing hole sizes but replace the entire mandrel. Evidently they have also looked at the part of the tool which supports the forward portion of the mandrel and keeps it coaxially aligned with the hole to be grooved and reasoned that, since this must also be changed to a different size in order to obtain a different radial spacing from the mandrel axis, there was no possible design alternative but to change all parts together to a different size, i.e., to an entire tool of such changed size. Such has been the practice even prior to the 1948 development of the Pfrehm grooving tool, and was the still common practice just prior to the advent of the present invention.

The present inventor has rejected such reasoning and has conceived and reduced to practice a grooving tool which can be adjusted or changed to a wide range of sizes by nothing more than a simple changeover of two parts of the overall tool assembly, namely a portion of the mandrel and a ring or collar which furnishes sliding support for the forward portion of the mandrel.

Other disadvantages of prior art grooving tools are (1) they lack a readily adjustable means for predetermining the axial location of the grooves being formed over a wide range of axial distances, (2) they similarly lack a quick means for pre-fixing the depth of groove to be formed, (3) for the most part they are operable only at relatively low speeds, less than 100 revolutions per minute, and (4) most of them dissipate and waste energy by frictional contact between the workpiece and non-cutting parts of the tool. Such disadvantages are not present in the grooving tool of the present invention, as will be seen upon reading the following description of a preferred embodiment exemplified in the attached drawing, in which:

FIGURE 1 is an exploded perspective view of a preferred embodiment of the invention.

Figure 2:
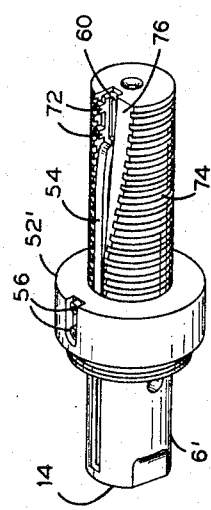
Figure 4:
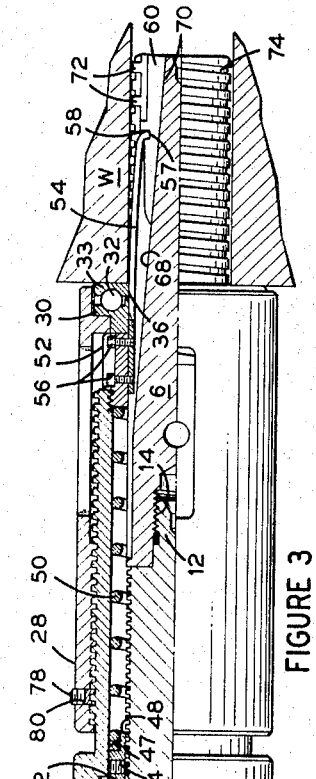
Figure 3:
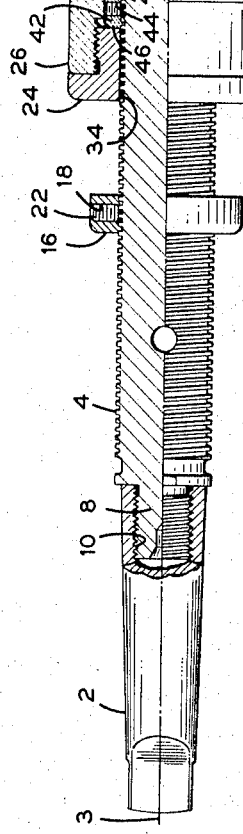
Figure 6:
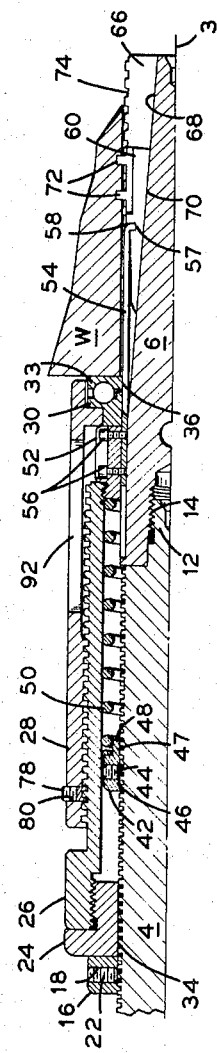

FIGURE 2 is a perspective view of the two parts of the grooving tool shown in FIGURE 1 which are used as replacements in a size changeover, the two parts shown in each of the two figures being of decreased size in going from the first to the second-numbered figure, FIGURE 3 is a side view of the same embodiment, half in elevation and half in longitudinal section, showing the tool inserted in the hole of a workpiece to be grooved but with the mandrel and bit in retracted or relaxed position, FIGURE 4 is an end view of the grooving tool, the distant end which enters the workpiece, FIGURE 5 is a top view of only the forward end of the same grooving tool, this view being rotated 90° from the view of FIGURE 3, and FIGURE 6 is the same as the half-section of FIGURE 3 except that the mandrel has been extended axially into the hole of the workpiece, forcing the bit radially outwardly to cut a groove as the tool is rotated.

Starting at the near end of the illustrated tool and proceeding toward the distant workpiece end, the successively joined parts of the mandrel subassembly are the chuck-engageable shank 2, mandrel body 4, and mandrel extension 6. It is not important that shank 2 and mandrel body 4 are screwed together by the reduced diameter, threaded neck 8 of the body mating with the correspondingly threaded longitudinal hole 10 in the forward end of shank 2, as parts 2 and 4 may be and have been made as a single piece. However, it is very important that mandrel body 4 and mandrel extention 6 be made as separate pieces, and that some readily separable connecting means be provided to connect these two members, e.g., the threaded neck 12 at the forward end of body 4 and the correspondingly threaded longitudinally extending opening 14 in the rear end of mandrel extension 6. It is an important part of the invention that body 4 and extension 6 be separably or removably connected for common rotation and common axial movement by some means as the illustrated screwed connection, as in changing to a different hole size mandrel extention 6 is one of the two parts which are removed and replaced with similar pieces of a different size, e.g., the smaller diameter mandrel extension 6' shown in FIGURE 2 (and the spring adaptor ring 52' also shown in that figure).

Mounted most rearwardly on the threaded outer surface of mandrel body 4 is a stop ring 16 whose relative axial position on the body can be adjusted by virtue of its threaded engagement therewith. It is stop ring 16 which determines the radial extend or depth of the grooves formed in workpiece W, because this member is removably secured in position on body 4 by a set screw 22 engaging the indicated threaded transverse opening 18 in ring 16 and pressing against body 4. As the mandrel subassembly and stop ring 16 are moved forward during operation, they are necessarily halted when stop ring 16 comes into contact with the rearwardly disposed end cap 24 of the housing assembly consisting of rear end cap 24, inner barrel or housing 26, outer barrel or housing 28 and forward end cap 30 with its pressed-in bearing 32. Stop ring 16 may be readily moved forward to a closer initial spacing from end cap 24 to decrease the depth of grooves formed by the bit 60, and may just as easily be moved to a larger initial spacing to increase the depth of grooving.

The four components of the housing subassembly are successively threaded to one another as illustrated, and it is important to observe that one of them are threaded onto the mandrel subassembly, but rather the latter passes through the longitduinal openings 34 and 36 at opposite ends of the former with a slight radial gap to permit frictionless axial movement therethrough during operation.

The only member threaded onto the periphery of the mandrel subassembly in addition to stop ring 16 is the spring compression adjustment sleeve 42, which is adjustably secured in relative axial position on mandrel body 4 by a set screw 44. Spring sleeve 42 has a larger diameter rearward portion 46 and a reduced diameter forward portion 48 which fits within the interior of the illustrated helical compression spring 50, and the shoulder 47 at the intersection of these two portions serves as a rearward abutment for the helical main spring 50. Main spring 50 loosely surrounds mandrel body 4 and mandrel extension 6, fits slidably and snugly within the bore of inner barrel 26, and abuts at its forward end the spring adaptor ring 52 threadedly secured in the forward end of the inner barrel 26. In the relaxed position of the assembly shown in FIGURE 3, main spring 50 is only slightly compressed between sleeve 42 and ring 52, and presses rearwardly against the former to push the mandrel subassembly rearwardly from the workpiece. In FIGURE 6, main spring 50 has been compressed by holding the tool against workpiece W and further pushing on the mandrel to cause it to slide forward within the housing.

The chief function of spring adaptor ring 52 is to support mandrel extension 6 and hold it coaxially aligned with the hole in workpiece W, and to achieve this purpose it has an inside diameter substantially equal to the diameter of the mandrel extension, being greater therefrom by just enough clearance to allow axial sliding of the mandrel through its opening. It also serves as a convenient means to anchor the rearward end of the elongated bar-type or leaf-type bit spring 54 in proper position relative to the longitudinal axis 3 of the mandrel assembly, an employment which is conveniently accomplished by the headed machine screws 56 extending transversely through openings in ring 52 to engage threaded openings in spring 54. Spring 54 is radially resilient and elongated along the longitudinal axis of the tool, and terminates forwardly in an inturned lip 57 which engages a transverse slot 58 in a cutter or bit 60. In the relaxed position of FIGURE 3 the bit spring 54 bows concavely inward, enabling it to retain its engagement in the slot 58 of the bit even though the bit is disposed at its closest spacing from the mandrel axis, and yet permitting a retention of such engagement when such spacing is increased and the spring is flattened against the borewall of the hole being grooved, as shown in the extended position of the tool illustrated in FIGURE 6.

Mandrel extension 6 has an elongated longitudinal groove 66 extending backward from its forward end, and for most of its length this groove 66 tapers rearwardly and outwardly so that its bottom surface 68 is an inclined plane having a forward and inward slope. Bit 60 has on its radially inner end a surface 70 of matching slope, so that as the mandrel moves forward the bit is slidable on inclined plane 68 to cause the bit to be pushed radially outwardly from axis 3 of the tool and pressing the cutting tips 72 against the borewall of the workpiece. As the mandrel is rotated at high speed and the mandrel is pushed forcibly into the hole of the piece, cutting tips 72 dig into the borewall and form metal cuttings or shavings which are carried forwardly in the helical groove 74 of mandrel extension 6. The hole 76 in the front end of mandrel 6 (see FIGURES 4 and 5) and in advance of cutting tips 72 is also provided to accommodate cuttings and prevent them from jamming the tool in the hole.

With respect to the engagement of outer barrel 28 on inner barrel 26 of the housing, it will be apparent that this is accomplished primarily by the illustrated threads on the inside diameter of the one and the outside diameter of the other, and that a selected relative axial relationship between the two for a given job is secured by a means such as set screw 78 engaging a threaded transverse hole 80 in the outer barrel and pressing against the outside diameter of inner barrel 26. In the assembly illustrated in FIGURE 3 the outer barrel is threaded as far as possible onto the inner barrel, so that the forward end cap 30 of outer barrel 28 butts tightly against the spring adaptor ring 52 on the forward end of inner barrel 26. It will be apparent that such maximum engagement is not necessary, and that outer barrel 28 may be screwed onto inner barrel 26 to leave an axial gap between ring 52 and end cap 30, and in so doing inner barrel 26, adaptor ring 52 and bit spring 54 will be spaced further to the rear from the face of the workpiece. Thus the tool provides a means for varying the axial locations of the grooves formed therein, as bit 60 and its cutting tips 72 will be moved rearwardly at the same time that bit spring 54 is moved rearwardly to an increased spacing from the workpiece. The long length of the threaded connection between the inner and outer barrels makes possible a correspondingly wide range in the axial locations of the grooves formed by the cutting tips of the bit, e.g., from 0 to 4 inches from the front face of workpiece W. Such axial location can also be varied, of course, by substituting bits of different lengths and with different locations and numbers of the cutting tips thereon, and bit springs like 54 of various lengths may also be used.

The bearing 32 is a self-contained antifriction bearing provided with internal lubrication and a seal to prevent leakage. It is simply screwed or force fitted into end cap 30, and its forward face is the only part of the tool touching the workpiece except for mandrel extension 6 and bit 60. This bearing serves to increase the efficiency of the tool by eliminating frictional contact with the workpiece, as its forward race member 33 when pushed against the workpiece remains stationary during a cutting operation while the entire balance of the tool rotates with the mandrel, the housing subassembly rotating with the mandrel subassembly by virtue of the fit of bit 60 and its spring 54 (secured to inner housing 26) in the groove 66 of mandrel extension 6. By contrast, in most prior art tools there is no such bearing but there is a solid end cap which rotates with the mandrel and grinds against the workpiece to dissipate energy wastefully through fraction and heat.

It will now be apparent that the invention makes it possible to convert the illustrated grooving tool from use in grooving one size hole to use in grooving a different size simply by replacing mandrel extension 6 with a mandrel extension 6' and by replacing spring adaptor ring 52 with a spring adaptor ring 52' of the appropriate size for use with mandrel 6'. The changeover is simple and quickly accomplished, as the only part to be disassembled and reassembled (the identical piece) is outer barrel 28, which is quickly unscrewed from inner barrel 26 by loosening set screw 78 and leaving front end cap 30 and bearing 32 in place. An optional means for assembling the inner and outer barrels is indicated in phantom in FIGURE 1, the same consisting of a number of longitudinal slots 90 on the outer surface of inner barrel 26. This eliminates the need for threads on both members, set screws not shown through outer barrel 28 and into slots 90 being used to hold the barrels together for common movement. In removing ring 52 and replacing it with a ring 52', a bit spring 54 may be left assembled to each such adaptor ring with a pair of screws 56, as these items are relatively inexpensive and the time to separate them from one ring and assemble them to another saves down time during the changeover.

The savings to the grooving tool user made possible by the invention are considerable, as the mandrel extension and adaptor ring together make up only a minor fraction of the cost of a complete tool, say about 15%. A single package can be provided in which all diameters from ⅝ of an inch up 1½ inches are provided for by one overall assembly 7 groups of replacement parts, thus permitting every increase in hole size in ⅛ inch steps to be grooved. Assuming a complete assembly to cost five hundred dollars and the replacement parts to cost an average of seventy-five dollars each, the total cost to the user is only one thousand and twenty-five dollars. Prior art separate assemblies for each of the corresponding sizes will average at least three hundred dollars for the eight tools required, making the total cost not less than twenty-four hundred dollars. The obvious savings thus better than halves the cost of a major item of capital equipment.

Having had described to him a specified preferred embodiment of the invention, as illustrated in the accompanying drawing, the reader of average skill will readily appreciate the advantages of the invention and will quickly perceive many minor modifications in the described embodiment to accomplish such advantages. The general structural scheme is that of two axially elongated subassemblies, a housing subassembly and a mandrel assembly which is axially slidable within the housing as the latter is held in place against a workpiece. The main function of the mandrel is to furnish torque to the bit which forms the grooves and to force the bit into progressively deeper contact with the workpiece as its extension containing the tapered bottom groove is inched forwardly into the workpiece and cams the bit outwardly from the axis of rotation. Deeping of the circumferential groove is brought to a halt when a ring fixed at a predetermined axial position on the body of the mandrel comes into contact with the housing and thus arrests the forward axial motion of the mandrel. It will be apparent that the adjustable positioning of this ring on the mandrel affords a quickly adjusted means for determining the depth of the grooves for the bit, as such position determines the axial stroke of the mandrel and such stroke is easily translated into the radial extent of cutter movement for any given slope of groove bottom.

The housing subassembly has as its several functions (1) securing the bit in a predetermined axial position while permitting it to move radially under the influence of the camming action of the mandrel extension, (2) keeping the mandrel subassembly coaxially aligned with the axis of the hole being grooved to insure that the grooves will be formed perpendicular to the hole rather than cocked, this being accomplished largely through the pair of end caps at the opposite ends of the inner barrel (end cap 24 and spring adaptor ring 52) and the axial openings through such caps which are approximately equal to the mandrel diameters and receive the mandrel in snug but sliding relationship, and (3) providing an elongated annular chamber which receives a main spring and permits compression of such spring during operation, this chamber also receiving in slidable relationship an outwardly extending flange or sleeve secured on the outside of the mandrel to accomplish a loose connection of the two subassemblies to prevent their separation when the tool is not in use. The housing is made adjustably telescopic in length by forming it in two parts which are movable axially with respect to each other to control the axial location of the bit over a wide range of axial location.

The axially elongated windows 92 in outer barrel 28 are provided to feed coolant to the bit 54 while the tool is working. The coolant is dripped onto the outer barrel from above in the vicinity of windows 92, passes through the windows and flows forwardly to the bit through groove 66. The tool is designed for use with high speed cutting bits, at speeds up to 500 revolutions per minute, at which speeds some coolant supply is necessary to prevent the bit from burning up. This is readily accomplished if the tool is used in a vertical position with the plate being grooved supported in a horizontal position. The shank of the mandrel may be chucked into a drill press and a jig may be provided to align the axis of the hole being grooved with the axis of the drill press, the jig being manipulated to shift the plate and bring successive holes into alignment with the grooving tool.

What is claimed is:

1. A rotary grooving tool comprising a bit in the general form of an elongated, diagonally cut half block with a tapering bottom surface and cutting teeth on the side opposite said tapering surface, an axially elongated housing subassembly and an axially elongated mandrel subassembly slidable within said housing subassembly and projecting from the ends thereof, the rearward one of said projecting ends being shaped for engagement by the chuck of a rotary driver while the opposed forward end contains a longitudinal groove having a bottom surface in the form of an inclined plane tapering inwardly and forwardly, said groove receiving said bit with the tapered surface of the bit in sliding contact with the tapered surface of the groove, said mandrel subassembly comprising a rearwardly disposed body and a forwardly disposed extension detachably secured to said body for common rotary and axial movement therewith, said mandrel extension containing said tapered groove, said housing having at its ends a pair of spaced apart caps or rings which accommodate said mandrel subassembly in relative sliding relationship and act as steadies therefor, the forward member of said pair of rings having secured thereto a forwardly projecting, radially resilient spring member extending into said groove of the mandrel extension and engaging a groove in said bit to fix the axial position of the bit relative to said housing, said mandrel extension being chosen with an outside diameter substantially equal to the diameter of a hole in a workpiece to be grooved and said forward end ring being chosen to accommodate the chosen mandrel extension, both said mandrel extension and forward end ring being replaceable by similar members of different sizes adapted for grooving workpiece holes of different diameters.

2. The rotary grooving tool of claim 1 in which said housing has an annular space between said pair of end rings, said mandrel body has a spring collar secured on its outer surface and lying within said annulus adjacent said rearward end ring of the housing, and which includes a resilient spring member disposed in said annular space with its rearward end abutting said spring collar of the mandrel body and its forward end abutted the forward end ring of the housing, said spring biasing the mandrel subassembly to a relaxed position in which said spring contacts the rearward ring of the housing and said mandrel extension causes said bit to be seated in the groove of the mandrel extension in spaced relationship from the wall of the hole to be grooved, said spring being compressible as the mandrel is pushed forward to permit the mandrel extension to cam the bit outwardly into contact with such wall of the hole and form grooves thereon as said tool is rotated.

3. The rotary grooving tool of claim 1 which includes a stop collar detachably secured on said mandrel body rearwardly from the rear end cap of said housing at a selected spacing therefrom, said collar contacting said end cap as the mandrel subassembly is moved forward within said housing to halt further such motion and thereby limit the radial dimension or depth of the grooves formed by the bit of the tool as it is rotated, said stop collar being movable and resecurable on said mandrel body at other selected spacings from said end cap to vary the depth of said grooves.

4. The rotary grooving tool of claim 1 in which said housing subassembly includes an axially elongated inner barrel and an axially elongated outer barrel detachably secured to and surrounding said inner barrel, said outer barrel being mounted on the inner barrel from the forward end of the inner barrel so that a portion of the inner barrel projects rearwardly from their assembly and a portion of the outer barrel extends forwardly beyond the inner barrel, said pair of end rings of the housing both being mounted on said inner barrel, the tool as thus assembled being used with the forward end of the outer barrel in contact with the outer face of the workpiece to be grooved with a selected spacing between said outer face and said forward end ring which is attached to the bit through the radially resilient spring determining the axial location of the grooves, said outer housing being movable and resecurable to the inner housings with different spacings of said forward end ring from the front face of the workpiece to provide different axial locations of said grooves.

5. The rotary grooving tool of claim 4 in which said outer barrel has a bearing member secured in its forward end, said bearing member including an inner race member disposed within the barrel and secured thereto for common rotation therewith and an outer race member adapted to contact the front face of the workpiece and remain fixed with respect thereto while said outer barrel is being rotated with said tool, thereby avoiding wasteful dissipation of energy by frictional contact between said barrel and workpiece and also avoiding any scoring of the workpiece.

6. In a rotary grooving tool which includes an axially elongated, hollow housing subassembly having a cutting bit attached to its forward end and projecting forwardly therefrom into a workpiece hole to be grooved, said bit having an inclined plane bottom surface facing the axis of said hole which tapers from a rearward maximum spacing from said axis to a minimum such forward spacing and a number of cutting teeth on its side opposed to such inclined plane which protrude radially outwardly from said axis, and which also includes an axially elongated mandrel subassembly disposed within said housing and projecting from both ends thereof with the housing acting as a steady for the mandrel to slide axially within the housing, the forwardly projecting end of said mandrel being substantially of the same diameter as said workpiece hole and containing a longitudinal groove receiving said cutting bit and having a tapered bottom surface contacting and matching in slope said inclined plane of the bit, said bit being thus adapted to form grooves in the workpiece as the mandrel is moved forwardly to cam the bit teeth against the sidewall of the hole and the tool is rotated to cause said teeth to dig into said sidewall and form cuttings therefrom, the improvement comprising (1) forming said mandrel subassembly in two parts, a rearwardly disposed mandrel body and a forwardly disposed mandrel extension which includes the portion entering said workpiece hole and containing said longitudinal groove, said body and extension being detachably secured together for common rotation and common axial movement, and said mandrel extension being replaceable by similar mandrel extensions of different diameter to form grooves in a workpiece hole of the same different diameter, and (2) providing an adaptor ring secured to the forward end of said housing, and having said bit secured thereto and projecting forwardly from the housing, said adaptor ring having an axial opening of a diameter substantially equal to that of the mandrel extension and accommodating the mandrel extension in snug, sliding relationship, said adaptor ring being detachably secured to said housing and replaceable at the same time said mandrel extension is changed with a similar adaptor ring having an axial opening therethrough of a diameter substantially equal to that of the replacement mandrel extension.

7. The improved rotary grooving tool of claim 6 as further improved by the inclusion of a stop collar mounted on the part of the mandrel body protruding rearwardly from said housing, said stop collar being disposed at a selected spacing from the rear end of said housing and contacting said rear end of the housing as said mandrel is moved axially forward to arrest further such movement and thus to halt the grooving operation at a depth corresponding to the selected collar to housing spacing, said stop collar being movable and resecurable to said mandrel body at different spacings from the housing to vary the depth of said grooves.

8. The improved grooving tool of claim 6 as further improved by providing said hollow housing in the form of a pair of telescopically disposed barrels, an inner barrel having said cutting bit attached to and extending forwardly from its forward end and an outer barrel surrounding the forward portion of the inner barrel and detachably secured thereto with a selected spacing between the forward ends of the two barrels, said forward end of the outer barrel being used against the front face of the workpiece so that said selected spacing determines the axial location of the grooves formed by the cutting bit, said outer barrel being movable and resecurable to the inner barrel to vary said axial location of the grooves.

9. The improved grooving tool of claim 8 which further includes a bearing subassembly secured in the forward end of said outer barrel, said bearing including an inner race member disposed within and rotating with the outer barrel and an outer race member projecting forwardly from said forward end of the outer barrel, said outer race member being adapted to be pressed against a workpiece and remain fixed with respect thereto while the other parts of the tool are rotating.

References Cited
UNITED STATES PATENTS

| | | | |
|---|---|---|---|
| 2,333,935 | 11/1943 | Jones | 77—58 |
| 2,365,549 | 12/1944 | Haynes | 77—58 |
| 2,457,269 | 12/1948 | Pfrehm | 77—58 |
| 2,545,443 | 3/1951 | Bowren | 77—58 |
| 2,869,404 | 1/1959 | Condrac | 77—58 |

GERALD A. DOST, *Primary Examiner.*